US012259671B2

(12) United States Patent
Kajiwara et al.

(10) Patent No.: US 12,259,671 B2
(45) Date of Patent: Mar. 25, 2025

(54) RESIN BELT, FIXING BELT, FIXING DEVICE, AND IMAGE FORMING APPARATUS

(71) Applicant: FUJIFILM BUSINESS INNOVATION CORP., Tokyo (JP)

(72) Inventors: Kenji Kajiwara, Kanagawa (JP); Hiroaki Tanaka, Kanagawa (JP); Taiki Nagamatsu, Kanagawa (JP); Tomotake Inagaki, Kanagawa (JP); Ryohei Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 3 days.

(21) Appl. No.: 18/457,836

(22) Filed: Aug. 29, 2023

(65) Prior Publication Data

US 2024/0329580 A1 Oct. 3, 2024

(30) Foreign Application Priority Data

Mar. 29, 2023 (JP) ................................ 2023-054182

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01); *G03G 2215/2009* (2013.01); *G03G 2215/2025* (2013.01)

(58) Field of Classification Search
CPC .......... G03G 15/2053; G03G 15/2057; G03G 15/206
See application file for complete search history.

(56) References Cited

U.S. PATENT DOCUMENTS

2006/0014021 A1* 1/2006 Sugawara .......... G03G 15/2057 428/421
2009/0010686 A1* 1/2009 Matsumoto ........ G03G 15/2057 399/324
2011/0003118 A1* 1/2011 Ohtsu .................. G03G 15/162 399/302

FOREIGN PATENT DOCUMENTS

JP 2005-031156 A 2/2005
JP 4340484 B2 10/2009

* cited by examiner

*Primary Examiner* — Carla J Therrien
(74) *Attorney, Agent, or Firm* — Oliff PLC

(57) ABSTRACT

A resin belt contains a resin, a low-melting-point alloy having a melting point of 370° C. or lower, and a fibrous filler.

10 Claims, 4 Drawing Sheets

RESIN BELT, FIXING BELT, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-054182 filed Mar. 29, 2023.

BACKGROUND

(i) Technical Field

The present invention relates to a resin belt, a fixing belt, a fixing device, and an image forming apparatus.

(ii) Related Art

JP2005-031156A suggests "a fixing member having a resin layer on a surface thereof, in which the resin layer has a first phase containing a low-melting-point metal and a second phase having a composition different from the first phase, and at least the first phase between the first phase and the second phase contains a filler".

SUMMARY

Aspects of non-limiting embodiments of the present disclosure relate to a resin belt that contains a resin, a low-melting-point alloy having a melting point of 370° C. or lower, and a fibrous filler and has higher thermal conductivity and higher mechanical strength compared to a resin belt that does not contain a low-melting-point alloy having a melting point of 370° C. or lower.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above object include the following aspect.

According to an aspect of the present disclosure, there is provided a resin belt that contains a resin, a low-melting-point alloy having a melting point of 370° C. or lower, and a fibrous filler.

BRIEF DESCRIPTION OF THE DRAWINGS

Exemplary embodiment(s) of the present invention will be described in detail based on the following figures, wherein.

DETAILED DESCRIPTION

Figure 1:
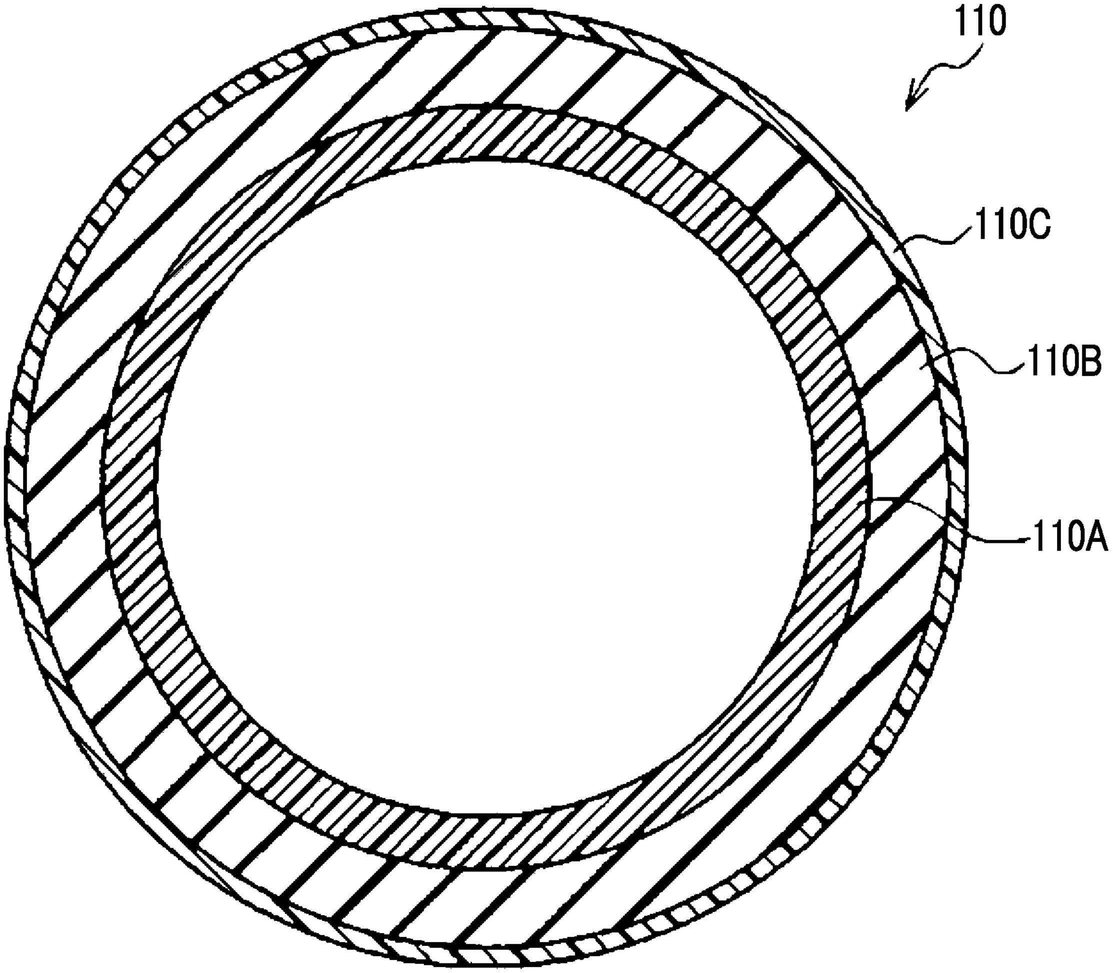
FIG. 1 is a schematic cross-sectional view showing an example of a resin belt according to the present exemplary embodiment.

The present exemplary embodiment will be described below. The following descriptions and examples merely illustrate exemplary embodiments, and do not limit the scope of the exemplary embodiments.

In the present exemplary embodiment, a range of numerical values described using "to" represents a range including the numerical values listed before and after "to" as the minimum value and the maximum value respectively.

Regarding the ranges of numerical values described in stages in the present exemplary embodiment, the upper limit or lower limit of a range of numerical values may be replaced with the upper limit or lower limit of another range of numerical values described in stages. Furthermore, in the present exemplary embodiment, the upper limit or lower limit of a range of numerical values may be replaced with values described in examples.

In the present exemplary embodiment, the term "step" includes not only an independent step but a step which is not clearly distinguished from other steps as long as the goal of the step is achieved.

In the present exemplary embodiment, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

In the present exemplary embodiment, each component may include two or more kinds of corresponding particles. In a case where there are two or more kinds of particles corresponding to each component in a composition, unless otherwise specified, the particle size of each component means a value for a mixture of two or more kinds of the particles present in the composition.

Resin Belt

The resin belt according to the present exemplary embodiment contains a resin, a low-melting-point alloy having a melting point of 370° C. or lower, and a fibrous filler.

In the resin belt of the related art that contains a resin and a fibrous filler, it is difficult for the major axis direction of the fibrous filler to form an angle with the thickness direction of the resin belt. Therefore, the resin belt has few portions to which the heat generated by the contact between the fillers is easily transferred, which makes it difficult to obtain high thermal conductivity.

However, simply increasing the amount of the fibrous filler added reduces the mechanical strength.

Accordingly, it is difficult to obtain a resin belt that satisfies both the thermal conductivity and mechanical strength.

Containing a resin, a low-melting-point alloy having a melting point of 370° C. or lower, and a fibrous filler, the resin belt according to the present exemplary embodiment brings about effects such as excellent thermal conductivity and excellent mechanical strength.

Presumably, melting of the low-melting-point alloy contained in the resin may cause the fibrous fillers in the resin to be connected to each other in the film thickness direction, which may improve the thermal conductivity of the resin belt. Furthermore, by melting, the low-melting-point alloy may enter the gaps of the resin, which may increase the adhesive strength between the components by an anchoring effect and enhance the mechanical strength of the resin belt as well.

Low-Melting-Point Alloy Having Melting Point of 370° C. or Lower

The resin belt according to the present exemplary embodiment contains a low-melting-point alloy having a melting point of 370° C. or lower.

The melting point of the low-melting-point alloy is 370° C. or lower. From the viewpoint of mechanical strength, the melting point is, for example, preferably 210° C. or higher and 370° C. or lower, more preferably 230° C. or higher and 370° C. or lower, and particularly preferably 250° C. or higher and 350° C. or lower.

The melting point of an alloy is measured using an endothermic profile in a heating process with a differential scanning calorimeter (DSC). In the DSC measurement of the heating process, the heat of fusion appears as an endothermic peak, and depending on the composition, the profile has a single endothermic peak or a plurality of endothermic peaks. In the present exemplary embodiment, for convenience, the maximum temperature at the endothermic peak is treated as the melting point of an alloy.

The low-melting-point alloy is not particularly limited as long as the melting point thereof is 370° C. or lower. Examples thereof include an alloy containing a metal such as Pb, Sn, Cu, Zn, Ag, or Bi.

Specifically, as the low-melting-point alloy, for example, it is possible to use alloys based on Pb/Sn, Pb/Sn/Bi, Pb/Sn/Cu, Pb/Sn/Sb, Pb/Sn/Sb/Cu, Pb/Sn/Ag, Pb/Ag, Sn/Ag, Sn/Bi, Sn/Cu, Sn/Zn, and the like.

From the viewpoint of thermal conductivity and mechanical strength, for example, the low-melting-point alloy preferably contains at least one metal selected from the group consisting of Pb, Sn, and Zn, preferably contains at least one metal selected from the group consisting of Sn and Zn, and particularly preferably contains Sn, among the above.

From the viewpoint of thermal conductivity and mechanical strength, as the alloy containing Sn, for example, a Pb/Sn alloy, a Pb/Sn/Bi alloy, a Pb/Sn/Cu alloy, a Pb/Sn/Sb alloy, a Pb/Sn/Sb/Cu alloy, a Pb/Sn/Ag alloy, a Sn/Ag alloy, a Sn/Bi alloy, a Sn/Cu alloy, or a Sn/Zn alloy is preferable, a Pb/Sn alloy, a Pb/Sn/Bi alloy, a Pb/Sn/Cu alloy, a Pb/Sn/Sb alloy, or a Pb/Sn/Sb/Cu alloy is more preferable, and a Pb/Sn alloy or a Pb/Sn/Sb/Cu alloy is particularly preferable.

The low-melting-point alloy may contain other elements in addition to the elements exemplified above.

The amount of the aforementioned other elements with respect to the entire low-melting-point alloy is, for example, preferably 20% by mass or less, more preferably 15% by mass or less, and particularly preferably 10% by mass or less.

The shape of the low-melting-point alloy is not particularly limited, and is preferably a particle-like shape.

Examples of the low-melting-point alloy include spherical particles, needle-shaped particles, flat particles, polygonal columnar particles, amorphous particles, and the like.

The resin belt may contain one low-melting-point alloy or two or more low-melting-point alloys.

From the viewpoint of thermal conductivity and mechanical strength, the content of the low-melting-point alloy with respect to the total mass of the resin belt is, for example, preferably 0.5% by mass or more and 20% by mass or less, more preferably 1% by mass or more and 10% by mass or less, even more preferably 2% by mass or more and 9% by mass or less, and particularly preferably 3% by mass or more and 8% by mass or less.

Fibrous Filler

The resin belt according to the present exemplary embodiment contains a fibrous filler.

In the present exemplary embodiment, "fibrous filler" is a filler of a compound other than a low-melting-point alloy having a melting point of 370° C. or lower. Furthermore, "fibrous filler" is particles having an aspect ratio of 2 or more.

From the viewpoint of thermal conductivity and mechanical strength, the aspect ratio of the fibrous filler is, for example, preferably 3 or more, more preferably 3 or more and 5,000 or less, and particularly preferably 3 or more and 3,000 or less.

The procedure for calculating the aspect ratio of the filler in the present exemplary embodiment is as follows.

The belt as a measurement target is cut with a microtome in the thickness direction of the belt, and the obtained cross section of the belt is observed with an electron microscope and photographed at 1,000X magnification. In the obtained photograph, 100 fillers are selected, and for each of the fillers, the minor axis (the length of a line segment included in the contour of the filler, among the straight lines orthogonal to the major axis) and the major axis (the longest line segment between two points in a case where two random points on the contour of the filler are connected) are measured. The arithmetic mean of the measured minor axes and the arithmetic mean of the measured major axes are determined, and the arithmetic mean of the major axes is divided by the arithmetic mean of the minor axes (arithmetic mean of major axes-arithmetic mean of minor axes) to calculate the aspect ratio.

From the viewpoint of improving the thermal conductivity of the resin belt, the thermal conductivity of the fibrous filler is, for example, preferably 500 W/mK or more.

The fibrous filler is not particularly limited, but is preferably fibrous carbon, for example.

"Fibrous carbon" is a material that contains carbon atoms as a main component (the content of carbon atoms in the material is 80% by mass or more) and has an aspect ratio of 2 or more.

As the fibrous filler, for example, carbon nanotubes are preferable.

Using carbon nanotubes as the fibrous filler further improves mechanical strength, results in high thermal conductivity, and further improves thermal conductance.

The resin belt may contain one fibrous filler or two or more fibrous fillers.

From the viewpoint of thermal conductivity and mechanical strength, the content of the fibrous filler with respect to the entire resin belt is, for example, preferably 5% by mass or more and 40% by mass or less, more preferably 8% by mass or more and 30% by mass or less, even more preferably 10% by mass or more and 20% by mass or less, and particularly preferably 12% by mass or more and 18% by mass or less.

From the viewpoint of thermal conductivity and mechanical strength, a ratio Mf/Mm of a content Mf of the fibrous filler to a content Mm of the low-melting-point alloy is, for example, preferably 0.5 or more and 20 or less, more preferably 1 or more and 10 or less, and particularly preferably 2 or more and 5 or less.

Resin

The resin belt according to the present exemplary embodiment contains a resin.

The resin is not particularly limited, and may be selected according to the use of the resin belt.

As the resin, for example, a heat-resistant resin is preferable.

Examples of the resin include heat-resistant resins having high heat resistance and high strength, such as liquid crystal materials including polyimide, aromatic polyamide, a thermotropic liquid crystal polymer, and the like. In addition to these, polyester, polyethylene terephthalate, polyethersulfone, polyetherketone, polysulfone, polyimide-amide, and the like are used.

From the viewpoint of heat resistance and mechanical strength, the resin preferably contains, for example, polyimide among the above.

Examples of the polyimide include an imidized polyamic acid (polyimide resin precursor) which is a polymer of a tetracarboxylic dianhydride and a diamine compound. Specific examples of the polyimide include a resin obtained by polymerizing equimolar amounts of a tetracarboxylic dianhydride and a diamine compound in a solvent to obtain a polyamic acid solution and imidizing the polyamic acid.

Examples of the tetracarboxylic dianhydride include both the aromatic and aliphatic tetracarboxylic dianhydride compounds. From the viewpoint of heat resistance, for example, an aromatic tetracarboxylic dianhydride compound is preferable.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic) phenylphosphine oxide dianhydride, p-phenylene-bis (triphenylphthalic)dianhydride, m-phenylene-bis (triphenylphthalic)dianhydride, bis(triphenylphthalic)-4,4'-diphenyl ether dianhydride, bis(triphenylphthalic)-4,4'-diphenylmethane dianhydride, and the like.

Examples of the aliphatic tetracarboxylic dianhydride include an aliphatic or alicyclic tetracarboxylic dianhydride such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxyorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione, and the like.

Among these, as the tetracarboxylic dianhydride, for example, an aromatic tetracarboxylic dianhydride is preferable. Specifically, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, and 3,3',4,4'-benzophenonetetracarboxylic dianhydride are preferable, pyromellitic dianhydride, 3,3',4,4'-biphenyltetracarboxylic dianhydride, and 3,3',4,4'-benzophenonetetracarboxylic dianhydride are more preferable, and 3,3',4,4'-biphenyltetracarboxylic dianhydride is particularly preferable.

One tetracarboxylic dianhydride may be used alone, or two or more tetracarboxylic dianhydrides may be used in combination.

In a case where two or more tetracarboxylic dianhydrides are used in combination, either aromatic tetracarboxylic dianhydrides or aliphatic tetracarboxylic dianhydrides may be used in combination, or an aromatic tetracarboxylic dianhydride and an aliphatic tetracarboxylic dianhydride may be used in combination.

Incidentally, a diamine compound is a compound having two amino groups in the molecular structure. Examples of the diamine compound include both the aromatic and aliphatic diamine compounds. Among these, for example, an aromatic diamine compound is preferable.

Examples of the diamine compound include aromatic diamines such as p-phenylenediamine, m-phenylenediamine, 4,4'-diaminodiphenylmethane, 4,4'-diaminodiphenylsulfide, 4,4'-diaminodiphenylethane, 4,4'-diaminodiphenylether, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups, such as diaminotetraphenyl thiophene; aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,$0^{2.7}$]-undecylene dimethyldiamine, and 4,4'-methylenebis (cyclohexylamine), and the like.

Among these, as the diamine compound, for example, an aromatic diamine compound is preferable. Specifically, for example, p-phenylenediamine, m-phenylenediamine, 4,4'-diaminodiphenylmethane, 4,4'-diaminodiphenylether, 3,4'-diaminodiphenylether, 4,4'-diaminodiphenylsulfide, and 4,4'-diaminodiphenylsulfone are preferable, and 4,4'-diaminodiphenylether and p-phenylenediamine are particularly preferable.

One diamine compound may be used alone, or two or more diamine compounds may be used in combination.

In a case where two or more diamine compounds are used in combination, either aromatic diamine compounds or aliphatic diamine compounds may be used in combination, or an aromatic diamine compound and an aliphatic diamine compound may be combined.

Among these, from the viewpoint of heat resistance, as a polyimide, for example, an aromatic polyimide (specifically, an imidized polyamic acid (a polyimide resin precursor) which is a polymer of an aromatic tetracarboxylic dianhydride and an aromatic diamine compound) is preferable.

The aromatic polyimide is, for example, more preferably a polyimide having a structural unit represented by the following Formula (PI1).

(PI1)

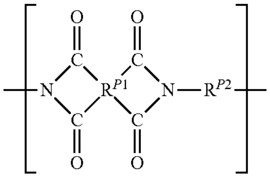

In Formula (PI1), $R^{P1}$ represents a phenyl group or a biphenyl group, and $R^{P2}$ represents a divalent aromatic group.

Examples of the divalent aromatic group represented by $R^{P2}$ include a phenylene group, a naphthyl group, a biphenyl group, a diphenyl ether group, and the like. As the divalent aromatic group, from the viewpoint of bending durability, for example, a phenylene group or a biphenyl group is preferable.

The number-average molecular weight of the polyimide is, for example, preferably 5,000 or more and 100,000 or less, more preferably 7,000 or more and 50,000 or less, and even more preferably 10,000 or more and 30,000 or less.

The number-average molecular weight of the polyimide is measured by gel permeation chromatography (GPC) under the following measurement conditions.

Column: Tosoh TSKgel α-M (7.8 mm I.D×30 cm)

Eluent: DMF (dimethylformamide)/30 mM LiBr/60 mM phosphoric acid

Flow rate: 0.6 mL/min

Injection amount: 60 μL

Detector: RI (differential refractive index detector)

The resin belt may contain one resin or two or more resins.

The content of the resin with respect to the entire resin belt is, for example, preferably 60% by mass or more, more preferably 65% by mass or more, even more preferably 75% by mass or more and 95% by mass or less, and particularly preferably 80% by mass or more and 90% by mass or less.

Additive

The resin belt according to the present exemplary embodiment may contain known additives such as a lubricant, in addition to the low-melting-point alloy, fibrous filler, and resin described above.

Characteristics of Resin Belt

Thickness

The thickness of the resin belt is, for example, preferably 20 μm or more and 200 μm or less, more preferably 30 μm or more and 150 μm or less, even more preferably 40 μm or more and 120 μm or less, and particularly preferably 70 μm or more and 100 μm or less.

The thickness of the resin belt is measured as follows.

The resin belt as a measurement target is cut in the thickness direction of the belt with a microtome, and the obtained cross section of the resin belt is observed with an electron microscope and photographed at an arbitrary magnification.

The photograph is observed, the thickness of the resin belt is measured at three random points, and an arithmetic mean thereof is calculated.

Thermal Conductivity

From the viewpoint of thermal conductance, the thermal conductivity of the resin belt according to the present exemplary embodiment is, for example, preferably 0.8 W/mK or more, more preferably 1.0 W/mK or more, and even more preferably 1.1 W/mK or more.

The thermal conductivity of the resin belt is measured as follows.

That is, a flat plate-shaped test piece is cut out from the target resin belt, and the thermal conductivity is obtained from the thermal diffusivity of the test piece in the thickness direction. Specifically, the test piece is placed on the probe of a thermal conductivity measuring device ai-Phase Mobile (manufactured by ai-Phase Co., Ltd.), a weight of 50 gf is then placed thereon, and the thermal conductivity is measured three times in a manual mode under the conditions of 1.41 V, a frequency range of 3 Hz to 100 Hz divided into 10 sections, and a measurement time of 2 seconds. The arithmetic mean of the values measured three times is adopted as the thermal conductivity of the belt.

Surface Roughness Ra of Inner Peripheral Surface Side of Resin Belt

A surface roughness Ra of the inner peripheral surface side of the resin belt according to the present exemplary embodiment is, for example, preferably 0.2 μm or more and 1.5 μm or less, more preferably 0.3 μm or more and 1.5 μm or less, and even more preferably 0.5 μm or more and 1.2 μm or less.

In a case where the surface roughness Ra of the inner peripheral surface side of the resin belt is 1.5 μm or less, the pressure applied to the projection portions of the resin belt is reduced. Therefore, in a case where the resin belt is driven, a member that comes into contact with the inner peripheral surface of the resin belt is likely to be worn.

Furthermore, in a case where the surface roughness Ra of the inner peripheral surface side of the resin belt is 0.2 μm or more, the inner peripheral surface of the resin belt has an appropriate surface roughness Ra, which reduces the friction between the inner peripheral surface of the resin belt and a member that comes into contact with the inner peripheral surface of the resin belt.

Shape of Resin Belt

From the viewpoint of increasing the choice of uses, improving bending durability, and the like, the resin belt according to the present exemplary embodiment is, for example, preferably an endless belt (also called a seamless belt). The endless belt means a seamless belt with both ends joined together.

Manufacturing Method of Resin Belt

It is preferable that the resin belt according to the present exemplary embodiment be manufactured, for example, by the following method.

That is, the resin belt according to the present exemplary embodiment is obtained through a step of preparing a coating liquid containing components configuring the belt (coating liquid-preparing step) and a step of coating a cylindrical substrate with the obtained coating liquid and drying the coating liquid (belt forming step). The coating liquid contains the low-melting-point alloy, fibrous filler, and resin described above, additives that are used as necessary, and the like.

In a case where the resin is polyimide, the resin belt according to the present exemplary embodiment can be manufactured by preparing a coating liquid containing the low-melting-point alloy, fibrous filler, and polyamic acid (a polyimide resin precursor) described above, additives used as necessary, and the like, coating a cylindrical substrate with the obtained coating liquid, and baking the coating film (that is, imidization).

Hereinafter, the manufacturing method of the resin belt according to the present exemplary embodiment will be more specifically described.

Coating Liquid-Preparing Step

In the coating liquid-preparing step, for example, first, it is preferable to mix the low-melting-point alloy, fibrous filler, and resin described above with a dispersion medium to prepare a coating liquid.

Examples of the dispersion medium include an organic solvent that does not dissolve or poorly dissolves the low-melting-point alloy and fibrous filler described above but is able to dissolve the resin. For example, in a case where a polyamic acid (a polyimide resin precursor) is used as the resin, examples of the dispersion medium include N-methyl-2-pyrrolidone (NMP), dimethyl sulfoxide (DMSO), and the like.

Belt Forming Step

It is preferable that the belt forming step be performed, for example, in order of the following (1) and (2).

(1) Coating a cylindrical substrate with a coating liquid and drying the coating liquid to form a coating film.

(2) Baking the coating film.

The drying temperature in (1) described above may be a temperature at which the volatilization of the dispersion medium contained in the coating liquid is facilitated. For example, it is preferable to appropriately adjust the drying temperature depending on the boiling point of the dispersion medium contained in the coating liquid. For example, in a case where N-methyl-2-pyrrolidone (NMP) is used as the dispersion medium, the drying temperature in (1) described above is preferably 160° C. or higher and 200° C. or lower.

The baking temperature in (2) described above is, for example, preferably a temperature higher than the drying temperature in (1) described above. In a case where the coating liquid contains a polyamic acid, the baking temperature in (2) described above is, for example, preferably a temperature at which imidization proceeds. In a case where the coating liquid contains a polyamic acid, the baking temperature in (2) described above is, for example, preferably 300° C. or higher and 400° C. or lower.

Hitherto, an example of the manufacturing method of the resin belt has been described. However, the manufacturing method of the resin belt according to the present exemplary embodiment is not limited thereto.

For example, a cylindrical substrate may be coated with a coating liquid by a method of preparing a filler-free coating liquid that contains a resin and a dispersion medium, and adding a filler to the coating liquid in a state where a cylindrical substrate is being coated with the coating liquid such that the content of the filler in the coating liquid gradually increases. The coating film obtained by the coating with the coating liquid by the above method may be dried and baked such that a resin belt is manufactured.

Use of Resin Belt

Preferred examples of uses of the resin belt according to the present exemplary embodiment include a fixing belt, a cooling belt, and the like.

Fixing Belt

The fixing belt according to the present exemplary embodiment may have the resin belt according to the present exemplary embodiment. It is preferable that the fixing belt according to the present exemplary embodiment have, for example, a substrate layer consisting of the resin belt according to the present exemplary embodiment, an elastic layer on the substrate layer, and a surface layer on the elastic layer.

That is, it is preferable that the fixing belt according to the present exemplary embodiment have, for example, the aforementioned resin belt according to the present exemplary embodiment as a substrate layer and an elastic layer and a surface layer that are provided in this order on the substrate layer.

The fixing belt according to the present exemplary embodiment will be described with reference to FIG. 1.

FIG. 1 is a schematic cross-sectional view showing an example of the fixing belt according to the present exemplary embodiment.

A fixing belt 110 shown in FIG. 1 has a substrate layer 110A, an elastic layer 110B provided on the substrate layer 110A, and a surface layer 110C provided on the elastic layer 110B.

The layer configuration of the fixing belt 110 according to the present exemplary embodiment is not limited to the layer configuration shown in FIG. 1. The fixing belt 110 may have a layer configuration in which an adhesive layer is interposed between the substrate layer 110A and the elastic layer 110B or a layer configuration in which an adhesive layer is interposed between the elastic layer 110B and the surface layer 110C.

Hereinafter, the main constituent components of the fixing belt according to the present exemplary embodiment will be specifically described. Note that the reference numerals will not be described.

Substrate Layer

In the fixing belt according to the present exemplary embodiment, the resin belt according to the present exemplary embodiment is used as a substrate layer.

From the viewpoint of thermal conductivity, bending resistance, and the like, the film thickness of the substrate layer in the fixing belt according to the present exemplary embodiment is, for example, preferably 20 μm or more and 200 μm or less, more preferably 30 μm or more and 150 μm or less, even more preferably 40 μm or more and 120 μm or less, and particularly preferably 70 μm or more and 100 μm or less.

Examples of the method of forming the substrate layer include the aforementioned manufacturing method of the resin belt according to the present exemplary embodiment.

Elastic Layer

It is preferable that the fixing belt according to the present exemplary embodiment have, for example, an elastic layer on the substrate layer (that is, the resin belt according to the present exemplary embodiment).

The elastic layer is not particularly limited as long as it is a layer having elasticity.

The elastic layer is a layer provided from the viewpoint of imparting elasticity against the pressure applied to the fixing belt from the outer peripheral side, and plays a role of conforming to the roughness of a toner image on a recording medium such that the surface of the fixing belt tightly adheres to the toner image.

It is preferable that the elastic layer be configured, for example, with an elastic material which restores the original shape even being deformed by the application of an external force of 100 Pa.

Examples of the elastic material used for the elastic layer include a fluororesin, a silicone resin, silicone rubber, fluororubber, fluorosilicone rubber, and the like. As the material of the elastic layer, from the viewpoint of heat resistance, thermal conductivity, insulating properties, and the like, for example, silicone rubber and fluororubber are preferable, and silicone rubber is more preferable.

Examples of the silicone rubber include RTV silicone rubber, HTV silicone rubber, liquid silicone rubber, and the like. Specific examples thereof include polydimethyl silicone rubber (MQ), methyl vinyl silicone rubber (VMQ), methyl phenyl silicone rubber (PMQ), and fluorosilicone rubber (FVMQ), and the like.

As the silicone rubber, for example, silicone rubber that is crosslinked generally by an addition reaction is preferable. Various types of functional groups are known for silicone rubber. As the silicone rubber, for example, dimethyl silicone rubber having a methyl group, methyl phenyl silicone rubber having a methyl group and a phenyl group, vinyl silicone rubber having a vinyl group (vinyl group-containing silicone rubber), and the like are preferable.

Furthermore, as the silicone rubber, for example, vinyl silicone rubber having a vinyl group is more preferable, and silicone rubber that has an organopolysiloxane structure having a vinyl group and a hydrogen organopolysiloxane structure having a hydrogen atom bonded to a silicon atom (SiH) is even more preferable.

Examples of the fluororubber include vinylidene fluoride-based rubber, ethylene tetrafluoride/propylene-based rubber, ethylene tetrafluoride/perfluoromethylvinyl ether rubber, phosphazene-based rubber, fluoropolyether, and the like.

It is preferable that the elastic material used for the elastic layer contain, for example, silicone rubber as a main component (that is, the content of the silicone rubber is, for example, preferably 50% by mass or more with respect to the total mass of the elastic material).

The content of the silicone rubber with respect to the total mass of the elastic material used in the elastic layer is, for example, more preferably 90% by mass or more, and even more preferably 99% by mass or more. The content of the silicone rubber may be 100% by mass.

The elastic layer may contain an inorganic filler in addition to the elastic material, for the purpose of reinforcement, heat resistance, heat transfer, or the like. Examples of the inorganic filler include known inorganic fillers. Preferred examples of the inorganic filler include fumed silica, crystalline silica, iron oxide, alumina, metallic silicon, and the like.

Examples of the material of the inorganic filler include, in addition to the above ones, known inorganic fillers such as carbides (for example, carbon black, carbon fibers, carbon nanotubes, and the like), titanium oxide, silicon carbide, talc, mica, kaolin, calcium carbonate, calcium silicate, magnesium oxide, graphite, silicon nitride, boron nitride, cerium oxide, and magnesium carbonate.

Among these, in view of thermal conductivity, for example, silicon nitride, silicon carbide, graphite, boron nitride, and carbides are preferable.

The content of the inorganic filler in the elastic layer may be determined by the required thermal conductivity, mechanical strength, and the like, and is, for example, 1% by mass or more and 20% by mass or less. The content of the inorganic filler is, for example, preferably 3% by mass or more and 15% by mass or less, and more preferably 5% by mass or more and 10% by mass or less.

The elastic layer may contain, for example, a softener (such as a paraffin-based softener), a processing aid (such as stearic acid), an antioxidant (such as an amine-based antioxidant), a vulcanizing agent (such as sulfur, a metal oxide, or a peroxide), and the like, as additives.

The thickness of the elastic layer is, for example, preferably 30 μm or more and 600 μm or less and more preferably 100 μm or more and 500 μm or less.

The elastic layer may be formed by a known method. For example, a coating method is used.

In a case where silicone rubber is used as the elastic material of the elastic layer, for example, first, a coating liquid for forming an elastic layer is prepared which contains liquid silicone rubber that turns into silicone rubber by being cured by heating. Next, the substrate layer is coated with the coating liquid for forming an elastic layer to form a coating film, and the coating film is vulcanized as necessary, thereby forming an elastic layer on the substrate layer. During the vulcanization of the coating film, a vulcanization temperature is, for example, 150° C. or higher and 250° C. or lower, and the vulcanization time is, for example, 30 minutes or longer and 120 minutes or less.

Surface Layer

It is preferable that the fixing belt according to the present exemplary embodiment have, for example, a surface layer on the aforementioned elastic layer.

The surface layer is a layer that plays a role of inhibiting the molten toner image from being fixed to a surface (outer peripheral surface) coming into contact with a recording medium during fixing.

For the surface layer, for example, heat resistance or release properties are required. In this respect, for example, it is preferable to use a heat-resistant release material as the material configuring the surface layer. Specific examples of such a material include fluororubber, a fluororesin, a silicone resin, a polyimide resin, and the like.

Among these, for example, a fluororesin is preferable as the heat-resistant release material.

Specific examples of the fluororesin include a tetrafluoroethylene-perfluoroalkylvinyl ether copolymer (PFA), polytetrafluoroethylene (PTFE), a tetrafluoroethylene-hexafluoropropylene copolymer (FEP), a polyethylene-tetrafluoroethylene copolymer (ETFE), polyvinylidene fluoride (PVDF), polychlorotrifluoroethylene (PCTFE), vinyl fluoride (PVF), and the like.

A surface treatment may be performed on a surface of the surface layer, the surface being on the side of the elastic layer. The surface treatment may be a wet treatment or a dry treatment, and examples thereof include a liquid ammonia treatment, an excimer laser treatment, a plasma treatment, and the like.

The thickness of the surface layer is, for example, preferably 10 μm or more and 100 μm or less, and more preferably 20 μm or more and 50 μm or less.

The surface layer may be formed by a known method. For example, a coating method may be used.

Furthermore, a tubular surface layer may be prepared in advance, and the outer periphery of the elastic layer may be covered with the tubular surface layer, thereby forming the surface layer. Note that an adhesive layer (for example, an adhesive layer containing a silane coupling agent having an epoxy group) may be formed on the inner surface of the tubular surface layer, and then the outer periphery may be covered with the tubular surface layer.

The film thickness of the fixing belt according to the present exemplary embodiment is, for example, preferably 0.06 mm or more and 0.90 mm or less, more preferably 0.08 mm or more and 0.70 mm or less, and even more preferably 0.10 mm or more and 0.60 mm or less.

Fixing Device

The fixing device according to the present exemplary embodiment includes the fixing belt according to the present exemplary embodiment.

The fixing device according to the present exemplary embodiment has various configurations. Examples of the fixing device include a fixing device including a first rotary member and a second rotary member that is arranged in contact with an outer surface of the first rotary member, in which a recording medium having a toner image formed on the surface of thereof is inserted into a contact portion between the first rotary member and the second rotary member such that the toner image is fixed. Furthermore, the fixing belt according to the present exemplary embodiment is used as at least one of the first rotary member or the second rotary member.

Hereinafter, regarding the fixing device according to the present exemplary embodiment, a fixing device including a heating roll and a pressure belt will be described as a first exemplary embodiment, and a fixing device including a heating belt and a heating roll will be described as a second exemplary embodiment. Moreover, in the first and second exemplary embodiments, the fixing belt according to the present exemplary embodiment may be used for both the heating belt and pressure belt.

The fixing device according to the present exemplary embodiment is not limited to the first and second exemplary embodiments, and may be a fixing device including a heating roll or a heating belt and a pressure belt. In addition, the fixing belt according to the present exemplary embodiment can be used as both the heating belt and the pressure belt.

First Exemplary Embodiment of Fixing Device

Figure 2:
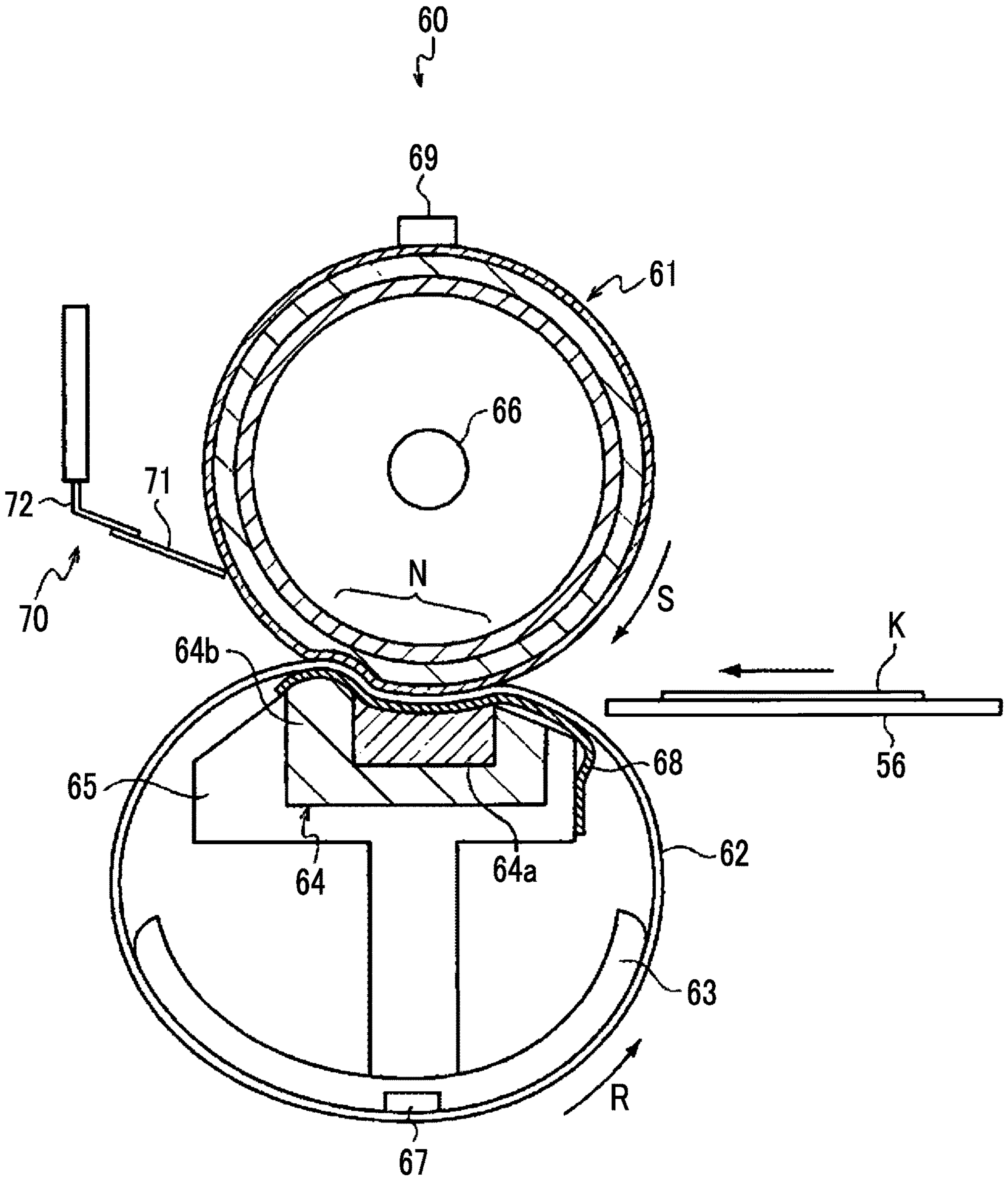
FIG. 2 is a schematic configuration view showing an example of a first exemplary embodiment of the fixing device according to the present exemplary embodiment.

The first exemplary embodiment of the fixing device will be described with reference to FIG. 2. FIG. 2 is a schematic view showing an example (that is, a fixing device 60) of a first exemplary embodiment of the fixing device.

As shown in FIG. 2, the fixing device 60 is configured, for example, with a heating roll 61 (an example of the first rotary member) that is driven to rotate, a pressure belt 62 (an example of the second rotary member), and a pressing pad 64 (an example of a pressing member) that presses the heating roll 61 via the pressure belt 62.

On the pressing pad 64, for example, the pressure belt 62 and the heating roll 61 may be relatively pressed. Therefore, the pressure belt 62 may be pressed on the heating roll 61, or the heating roll 61 may be pressed on the pressure belt 62.

A halogen lamp 66 (an example of a heating means) is provided on the inside of the heating roll 61. The heating means is not limited to the halogen lamp, and other heating members that generate heat may be used.

Meanwhile, for example, a thermosensitive element 69 is arranged in contact with the surface of the heating roll 61. The lighting of the halogen lamp 66 is controlled based on the temperature measured by the thermosensitive element 69, and the surface temperature of the heating roll 61 is kept at a target set temperature (for example, 150° C.).

The pressure belt 62 is rotatably supported, for example, by the pressing pad 64 and a belt running guide 63 arranged on the inside of the pressure belt 62. In a nip region N (nip portion), the pressure belt 62 is arranged such that the pressure belt 62 is pressed on the heating roll 61 by the pressing pad 64.

For example, the pressing pad 64 is arranged on the inside of the pressure belt 62 such that the pressing pad 64 is in a state of being pressed on the heating roll 61 via the pressure belt 62, and the nip region N is formed between the pressing pad 64 and the heating roll 61.

In the pressing pad 64, for example, a front nip member 64*a* for securing a wide nip region N is arranged on the entrance side of the nip region N, and a peeling nip member 64*b* for distorting the heating roll 61 is arranged on the exit side of the nip region N.

In order to reduce the sliding resistance between an inner peripheral surface of the pressure belt 62 and the pressing pad 64, for example, a sheet-like sliding member 68 is provided on a surface of the front nip member 64*a* and the peeling nip member 64*b*, the surface being in contact with the pressure belt 62. The pressing pad 64 and the sliding member 68 are held by a holding member 65 made of a metal.

The sliding member 68 is provided such that the sliding surface thereof is in contact with, for example, the inner peripheral surface of the pressure belt 62, and is involved in holding and supplying of oil existing between the sliding member 68 and the pressure belt 62.

For example, the holding member 65 has a configuration in which the belt running guide 63 is attached to the holding member 65, and the pressure belt 62 rotates.

A lubricant supply device 67, which is means for supplying a lubricant (for example, oil) to the inner peripheral surface of the pressure belt 62, may be mounted on the belt running guide 63.

The heating roll 61 rotates, for example, in the direction of an arrow S by a driving motor not shown in the drawing. Following the rotation, the pressure belt 62 rotates in the direction of an arrow R opposite to the rotation direction of the heating roll 61. That is, for example, the heating roll 61 rotates clockwise in FIG. 2, while the pressure belt 62 rotates counterclockwise.

Then, paper K (an example of a recording medium) having an unfixed toner image is guided, for example, by a fixing entrance guide 56 and transported to the nip region N. While the paper K is passing through the nip region N, the unfixed toner image on the paper K is fixed by the pressure and heat acting on the nip region N.

In the fixing device 60, for example, by the front nip member 64*a* in the form of a recess conforming to the outer peripheral surface of the heating roll 61, a wider nip region N is secured, compared to a configuration having no front nip member 64*a*.

Furthermore, the fixing device 60 is configured, for example, with the peeling nip member 64*b* that is arranged to protruding from the outer peripheral surface of the heating roll 61, such that the heating roll 61 is locally distorted much in the exit region of the nip region N.

In a case where the peeling nip member 64*b* is arranged as above, for example, the paper K after fixing passes through a portion that is locally distorted much while passing through a peeling nip region. Therefore, the paper K is easily peeled off from the heating roll 61.

As an auxiliary means for peeling, for example, a peeling member 70 is provided on a downstream side of the nip region N of the heating roll 61. The peeling member 70 is, for example, held by a holding member 72, in a state where a peeling claw 71 is close to the heating roll 61 in a direction (counter direction) opposite to the rotation direction of the heating roll 61.

Second Exemplary Embodiment of Fixing Device

Figure 3:
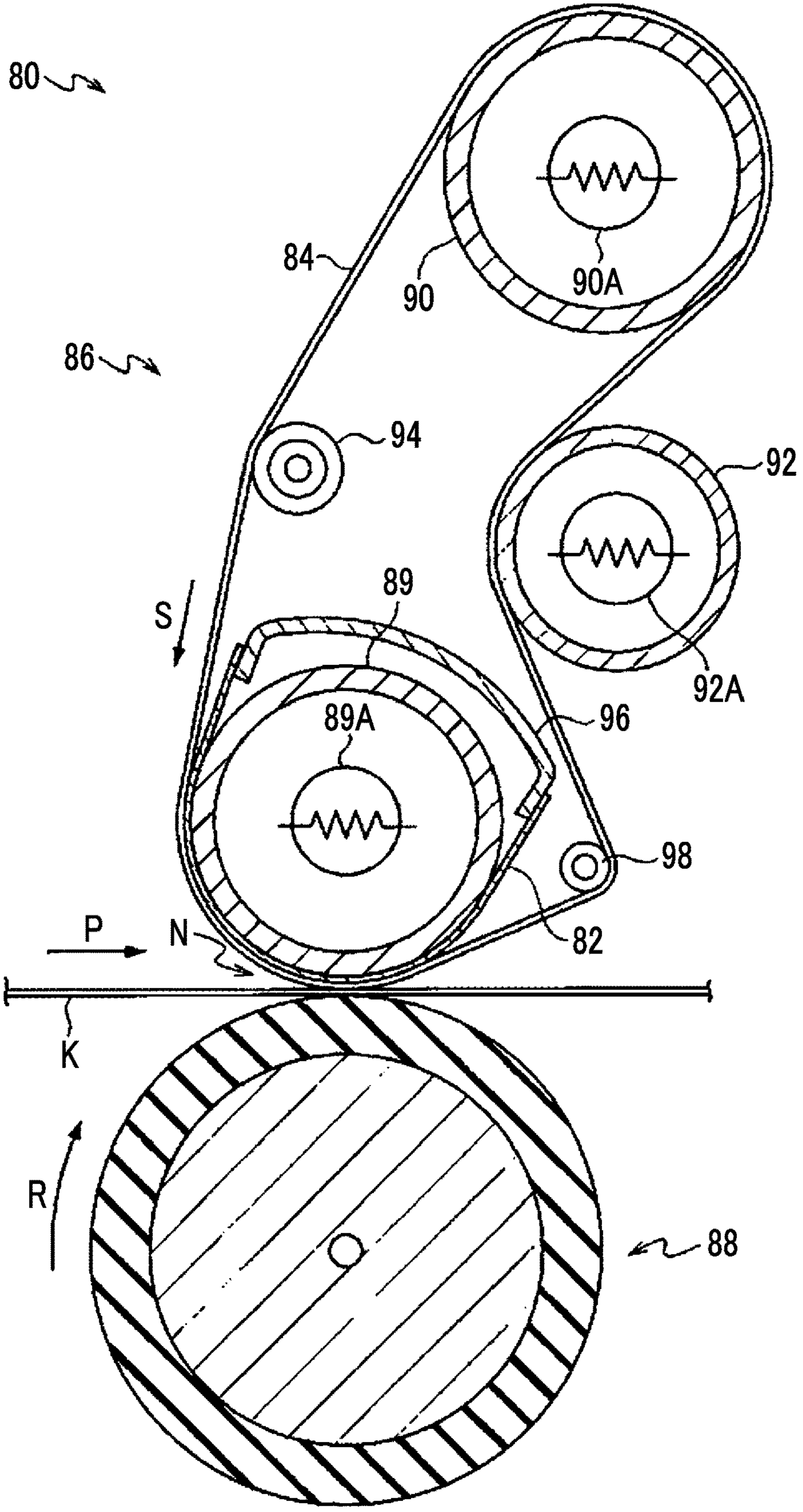
FIG. 3 is a schematic configuration view showing an example of a second exemplary embodiment of the fixing device according to the present exemplary embodiment.

A second exemplary embodiment of the fixing device will be described with reference to FIG. 3. FIG. 3 is a schematic view showing an example (that is, a fixing device 80) of a second exemplary embodiment of the fixing device.

As shown in FIG. 3, the fixing device 80 is configured, for example, with a fixing belt module 86 including a heating belt 84 (an example of the first rotary member) and a pressure roll 88 (an example of the second rotary member) arranged in a state of being pressed on a heating belt 84 (fixing belt module 86). For example, a nip region N (nip portion) is formed in a contact portion between the heating belt 84 (fixing belt module 86) and the pressure roll 88. In the nip region N, paper K (an example of a recording medium) is pressed and heated such that a toner image is fixed.

The fixing belt module 86 includes, for example, an endless heating belt 84, a heating and pressing roll 89 around which the heating belt 84 is wound on the side of the pressure roll 88 and which is driven to rotate by the rotational force of a motor (not shown in the drawing) and presses the heating belt 84 from an inner peripheral surface thereof toward the pressure roll 88, and a support roll 90 which supports the heating belt 84 from the inside at a position different from the heating and pressing roll 89.

The fixing belt module 86 is provided with, for example, a support roll 92 which is disposed outside the heating belt 84 and regulates the circulating path thereof, a posture correction roll 94 which corrects the posture of the heating belt 84 from the heating and pressing roll 89 to the support roll 90, and a support roll 98 which applies tension to the heating belt 84 from the inner peripheral surface on the downstream side of the nip region N formed between the heating belt 84 and the pressure roll 88.

The fixing belt module 86 is provided, for example, such that a sheet-like sliding member 82 is interposed between the heating belt 84 and the heating and pressing roll 89.

The sliding member 82 is provided such that the sliding surface thereof is in contact with, for example, the inner peripheral surface of the heating belt 84, and is involved in holding and supplying of oil existing between the sliding member 82 and the heating belt 84.

The sliding member 82 is provided, for example, in a state where both ends thereof are being supported by a support member 96.

On the inside of the heating and pressing roll 89, for example, a halogen heater 89A (an example of a heating means) is provided.

The support roll 90 is, for example, a cylindrical roll formed of aluminum. A halogen heater 90A (an example of a heating means) is provided on the inside of the support roll 90, such that the heating belt 84 is heated from the inner peripheral surface side.

Both end portions of the support roll 90 are provided with, for example, spring members (not shown in the drawing) pressing the heating belt 84 to the outside.

The support roll 92 is, for example, a cylindrical roll formed of aluminum. A release layer consisting of a fluororesin having a thickness of 20 μm is formed on a surface of the support roll 92.

The release layer of the support roll 92 is formed, for example, to prevent a toner or paper powder from the outer peripheral surface of the heating belt 84 from depositing on the support roll 92.

For example, a halogen heater 92A (an example of a heating means) is disposed on the inside of the support roll 92, such that the heating belt 84 is heated from the outer peripheral surface side.

That is, for example, the fixing belt module 86 is configured such that the heating belt 84 is heated, for example, by the heating and pressing roll 89, the support roll 90, and the support roll 92.

The posture correction roll 94 is, for example, a cylindrical roll formed of aluminum, and an end position measuring mechanism (not shown in the drawing) for measuring the end position of the heating belt 84 is disposed in the vicinity of the posture correction roll 94.

The posture correction roll 94 is provided with, for example, an axial displacement mechanism (not shown in the drawing) which displaces the contact position of the heating belt 84 in the axial direction according to the measurement result of the end position measuring mechanism, and is configured to control meandering of the heating belt 84.

Meanwhile, the pressure roll 88 is provided, for example, rotatably supported, and the heating belt 84 is provided to be being pressed against a portion wound around the heating and pressing roll 89 by an urging means such as a spring (not shown). As a result, as the heating belt 84 (heating and pressing roll 89) of the fixing belt module 86 rotates and moves in the direction of the arrow S, the pressure roll 88 follows the heating belt 84 (heating and pressing roll 89) and rotates and moves in the direction of the arrow R.

The paper K having an unfixed toner image (not shown in the drawing) is transported in the direction of an arrow P and is guided to the nip region N of the fixing device 80. While the paper K is passing through the nip region N, the unfixed toner image on the paper K is fixed by the pressure and heat acting on the nip region N.

For the fixing device 80, an embodiment has been described in which a halogen heater (halogen lamp) is used as an example of a plurality of heating means. However, the fixing device is not limited thereto, and a radiation lamp heating element (a heating element generating radiation (such as infrared rays) and a resistance heating element (a heating element generating Joule heat by passing an electric current through a resistor: for example, a heating element obtained by forming a film with a resistor on a ceramic substrate and baking the film) other than the halogen heater may be used.

Image Forming Apparatus

Next, the image forming apparatus according to the present exemplary embodiment will be described.

The image forming apparatus according to the present exemplary embodiment includes an image holder, a charging means that charges a surface of the image holder, an electrostatic latent image forming means that forms an electrostatic latent image on the charged surface of the image holder, a developing means that develops the electrostatic latent image formed on the surface of the image holder with a developer containing a toner to form a toner image, a transfer means that transfers the toner image to a surface of a recording medium, and a fixing means that fixes the toner image to the recording medium.

As the fixing means, the fixing device according to the present exemplary embodiment is used.

In the image forming apparatus according to the present exemplary embodiment, the fixing device may be made into a cartridge such that the fixing device is detachable from an image forming apparatus. That is, the image forming apparatus according to the present exemplary embodiment may include the fixing device according to the present exemplary embodiment, as a device configuring a process cartridge.

Hereinafter, the image forming apparatus according to the present exemplary embodiment will be described with reference to a drawing.

Figure 4:
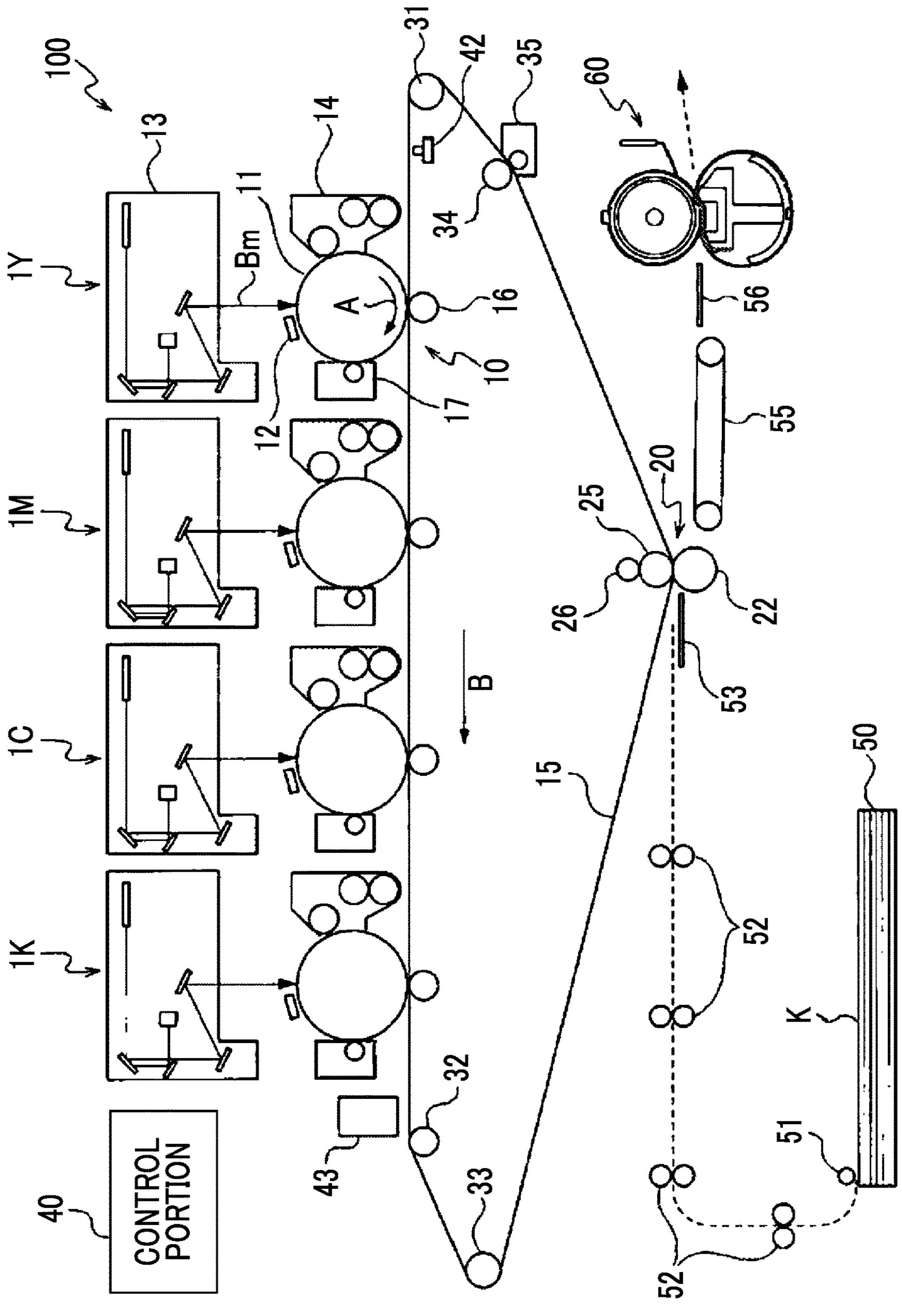
FIG. 4 is a schematic configuration view showing an example of an image forming apparatus according to the present exemplary embodiment.

FIG. 4 is a schematic configuration view showing the configuration of the image forming apparatus according to the present exemplary embodiment.

As shown in FIG. 4, an image forming apparatus 100 according to the present exemplary embodiment is, for example, an intermediate transfer-type image forming apparatus that is generally called a tandem type, and includes a plurality of image forming units 1Y, 1M, 1C, and 1K in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

The fixing device 60 is the first exemplary embodiment of the fixing device described above. The image forming apparatus 100 may be configured to include the second exemplary embodiment of the fixing device described above.

Each of the image forming units 1Y, 1M, 1C, and 1K of the image forming apparatus 100 includes a photoreceptor 11 that rotates in the direction of an arrow A, as an example of an image holder that holds a toner image formed on the surface.

As an example of a charging means, a charger 12 for charging the photoreceptor 11 is provided around the photoreceptor 11. As an example of a latent image forming means, a laser exposure machine 13 that draws an electrostatic latent image on the photoreceptor 11 is provided (in FIG. 4, an exposure beam is represented by a mark Bm).

Around the photoreceptor 11, as an example of a developing means, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

The intermediate transfer belt 15 which is an intermediate transfer member is configured with a film-shaped pressure belt including a base layer that is a resin such as polyimide or polyamide and containing an appropriate amount of an antistatic agent such as carbon black. Furthermore, the intermediate transfer belt 15 is configured to have a volume resistivity of $10^6$ Ωcm or more and $10^{14}$ Ωcm or less and has a thickness of about, for example, 0.1 mm.

By various rolls, the intermediate transfer belt 15 is driven to circulate (rotate) in a direction B shown in FIG. 4 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a support roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 comprises the back roll 25 and a secondary transfer roll 22 that is arranged on a toner image-holding surface side of the intermediate transfer belt 15.

The surface of the back roll 25 is configured with a tube of blended rubber of EPDM and NBR in which carbon is dispersed, and the inside of the back roll 25 is configured with EPDM rubber. Furthermore, the back roll 25 is formed such that the surface resistivity thereof is $10^7$ Ω/□ or more and $10^{10}$ Ω/□ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

The secondary transfer roll 22 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt cleaner 35 separable from the intermediate transfer belt 15 is provided which removes the residual toner or paper powder on the intermediate transfer belt 15 remaining after the secondary transfer and cleans the surface of the intermediate transfer belt 15.

The intermediate transfer belt 15, the primary transfer portion 10 (primary transfer roll 16), and the secondary transfer portion 20 (secondary transfer roll 22) correspond to an example of a transfer means.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

On the downstream side of the black image forming unit 1K, an image density sensor 43 for adjusting image quality is arranged.

The image forming apparatus according to the present exemplary embodiment includes, as a transport means for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport means, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt cleaner 35.

Hitherto, the present exemplary embodiment has been described. However, the present exemplary embodiment is not limited to the above exemplary embodiments, and various modifications, changes, and ameliorations can be added thereto.

EXAMPLES

Hereinafter, exemplary embodiments of the invention will be specifically described based on examples. However, the exemplary embodiments of the invention are not limited to the examples.

In the following description, unless otherwise specified, "parts" and "%" are based on mass.

Unless otherwise specified, synthesis, treatment, manufacturing, and the like are carried out at room temperature (25° C.±3° C.).

Examples 1 to 11 and Comparative Examples 1 to 3

Coating Liquid-Preparing Step

Preparation of Coating Liquid

The components described in Table 1 are added to N-methyl-2-pyrrolidone (NMP) at the mass ratio described in Table 1, followed by mixing, thereby preparing a coating liquid (solid content: 18% by mass).

Belt Forming Step

-(1)-

A cylindrical substrate having a surface roughness Ra of 0.8 μm is coated with the coating liquid, followed by drying at 100° C. for 80 minutes, thereby forming a coating film. The amount of the coating liquid used for coating is set such that a thickness of 80 μm is obtained after baking.

-(2)-

The coating film is baked at 380° C. for 40 minutes, thereby forming a seamless belt-shaped substrate layer (resin belt).

Formation of Elastic Layer

The outer peripheral surface of the obtained substrate layer is coated with liquid silicone rubber (manufactured by Shin-Etsu Chemical Co., Ltd., X34-1053), followed by heating at 110° C. for 15 minutes, thereby obtaining an elastic layer having a film thickness of 400 μm.

Formation of Surface Layer

Next, a fluororesin tube that contains a copolymer (PFA) of ethylene tetrafluoride and perfluoroalkoxyethylene and has a film thickness of 30 μm is molded by injection molding, and the inner surface of the tube is treated with liquid ammonia.

The fluororesin tube is put on the elastic layer and heated at 200° C. for 120 minutes, thereby forming a surface layer consisting of a fluororesin tube.

Through the above steps, a fixing belt is obtained.

Evaluation

The fixing belt obtained in each example is mounted as a heating belt on a fixing device of an image forming apparatus (manufactured by FUJIFILM Business Innovation Corp.: Versant 3100 Press) and evaluated as below.

Thermal Conductivity Immediately After Preparation of Resin Belt

The offcut cut in the process of preparing the fixing belt is used. From the offcut belt, the substrate layer is peeled off, thereby obtaining a sample of the substrate layer. The thermal conductivity of the obtained sample is measured by a temperature wave analysis method using a thermal diffusivity measuring device (manufactured by ai-Phase Co., Ltd.).

The evaluation standard is shown below.

A+: 1.3 W/m·K or higher

A: 0.8 W/m·K or more and less than 1.3 W/m·K

B: 0.5 W/m·K or more and less than 0.8 W/m·K

C: Less than 0.5 W/m·K

Thermal Conductivity After Use of Prepared Resin Belt as Fixing Belt

A solid image of a cyan toner is printed on 100,000 sheets of A4 paper by the image forming apparatus.

Then, from the fixing belt having been used for printing images, the substrate layer is peeled off, thereby obtaining a sample of the substrate layer. The thermal conductivity of the obtained sample is measured by a temperature wave analysis method using a thermal diffusivity measuring device (manufactured by ai-Phase Co., Ltd.).

The evaluation standard is shown below.

A+: 1.3 W/m·K or higher

A: 0.8 W/m·K or more and less than 1.3 W/m·K

B: 0.5 W/m·K or more and less than 0.8 W/m·K

C: Less than 0.5 W/m·K

Tensile Strength at Break

The offcut cut in the process of preparing the fixing belt is used. From the substrate layer peeled off from the offcut belt, a strip-shaped test piece is obtained.

By using a tensile tester (STROGRAPH manufactured by Toyo Seiki Seisaku-sho, Ltd.), the strip-shaped test piece (width 15 mm, length 50 mm) is pulled at a speed of 200 mm/min, and a tensile strength (MPa) at a point in time when the test piece breaks is determined as a tensile strength at break. The tensile strength is measured in a first direction (for example, the MD direction) along which the test piece is randomly cut and a second direction (for example, the TD direction) orthogonal to the first direction, and a lower strength is adopted as the tensile strength at break.

The evaluation standard is shown below.

A+: 230 MPa or more

A: 200 MPa or more and less than 230 MPa

B: 170 MPa or more and less than 200 MPa

C: Less than 170 MPa

| | Resin belt Unit: mass ratio (% by mass) | | | | | | | | |
|---|---|---|---|---|---|---|---|---|---|
| | Resin | | | Fibrous filler | | Low-melting-point alloy having melting point of 370° C. or lower | | | |
| | Resin A | Resin B' | Resin C' | | | Filler C Pb90Sn10 | Filler D Pb60Sn40 | Filler E Pb70Sn13Sb13Cu1 | Filler F Sn95Sb5 |
| | PI (polyimide) | PI (polyimide) | PC (polycarbonate) | Filler A Carbon nanotube | Filler B Carbon nanotube | (melting point 302° C.) | (melting point 238° C.) | (melting point 368° C.) | (melting point 241° C.) |
| Example 1 | 80% | 0% | 0% | 15% | 0% | 5% | 0% | 0% | 0% |
| Example 2 | 80% | 0% | 0% | 15% | 0% | 0% | 0% | 5% | 0% |
| Example 3 | 80% | 0% | 0% | 15% | 0% | 0% | 5% | 0% | 0% |

-continued

| | | | | | | | | | |
|---|---|---|---|---|---|---|---|---|---|
| Example 4 | 0% | 80% | 0% | 15% | 0% | 5% | 0% | 0% | 0% |
| Example 5 | 80% | 0% | 0% | 0% | 15% | 5% | 0% | 0% | 0% |
| Example 6 | 80% | 0% | 0% | 15% | 0% | 0% | 0% | 0% | 5% |
| Example 7 | 80% | 0% | 0% | 11% | 0% | 9% | 0% | 0% | 0% |
| Example 8 | 80% | 0% | 0% | 18% | 0% | 2% | 0% | 0% | 0% |
| Example 9 | 70% | 0% | 0% | 10% | 0% | 20% | 0% | 0% | 0% |
| Example | 89.5% | 0% | 0% | 10% | 0% | 0.5% | 0% | 0% | 0% |
| Example | 0% | 0% | 80% | 15% | 0% | 5% | 0% | 0% | 0% |
| Comparative Example 1 | 80% | 0% | 0% | 15% | 0% | 0% | 0% | 0% | 0% |
| Comparative Example 2 | 80% | 0% | 0% | 15% | 0% | 0% | 0% | 0% | 0% |
| Comparative Example 3 | 80% | 0% | 0% | 15% | 0% | 0% | 0% | 0% | 0% |

| | Resin belt Unit: mass ratio (% by mass) | | | | Evaluation result | | |
|---|---|---|---|---|---|---|---|
| | Other components | | | | Thermal conductivity | Thermal conductivity | |
| | Filler G Carton black | Filler H ZDCl (melting point 386° C.) | Filler I In52Sn48 (melting point 119° C.) | Total amount (% by mass) | immediately after preparation of resin belt (W/m · K) | after use as fixing belt (W/m · K) | Tensile strength at break (MPa) |
| Example 1 | 0% | 0% | 0% | 100% | A+ | A+ | A+ |
| Example 2 | 0% | 0% | 0% | 100% | A+ | A+ | A |
| Example 3 | 0% | 0% | 0% | 100% | A | A | A+ |
| Example 4 | 0% | 0% | 0% | 100% | A+ | A+ | A+ |
| Example 5 | 0% | 0% | 0% | 100% | A+ | A+ | A+ |
| Example 6 | 0% | 0% | 0% | 100% | A | A | A+ |
| Example 7 | 0% | 0% | 0% | 100% | A+ | A+ | A |
| Example 8 | 0% | 0% | 0% | 100% | A | A | A+ |
| Example 9 | 0% | 0% | 0% | 100% | B | B | C |
| Example | 0% | 0% | 0% | 100% | B | B | C |
| Example | 0% | 0% | 0% | 100% | B | B | C |
| Comparative Example 1 | 5% | 0% | 0% | 100% | C | C | C |
| Comparative Example 2 | 0% | 5% | 0% | 100% | C | C | C |
| Comparative Example 3 | 0% | 0% | 5% | 100% | B | C | B |

Table 1 will be described below.

Resin A "PI (polyimide)": a polyamic acid solution (manufactured by UNITIKA LTD.: TX-HMM (polyimide varnish), concentration of solid content: 18% by mass, solvent: NMP) is used. The amounts listed in Table 1 are amounts of solid content.

Resin B "PI (polyimide)": a polyamic acid solution (manufactured by UNITIKA LTD.: KX-HMM (polyimide varnish)

Resin C "PC (polycarbonate)": manufactured by TEIJIN LIMITED, molecular weight (Mw) 50,000

Filler A "Carbon nanotube A": manufactured by Showa Denko K. K., aspect ratio 15, fiber diameter 150 nm Filler B "Carbon nanotube B": manufactured by KOATSU GAS KOGYO CO., LTD., aspect ratio 40, fiber diameter 200 nm Filler C "Pb90Sn10": an alloy of 90% by mass of lead and 10% by mass of tin, melting point 302° C.

Filler D "Pb60Sn40": an alloy of 60% by mass of lead and 40% by mass of tin, melting point 238° C.

Filler E "Pb70Sn13Sb13Cu1": an alloy of 70% by mass of lead, 13% by mass of tin, 13% by mass of antimony, and 1% by mass of copper, melting point 368° C.

Filler F "Sn95Sb5": an alloy of 95% by mass of tin and 5% by mass of antimony, melting point 241° C.

Filler G "Carbon Black": manufactured by Cabot Japan K. K., particle size 5 μm

Filler H "ZDC1": Al4Cu1Mg0.05Fe0.1Zn94.85: an alloy of 4% by mass of Al, 1% by mass of Cu, 0.05% by mass of Mg, 0.1% by mass of Fe, and 94.85% by mass of Zn, melting point 386° C.

Filler I "In52Sn48": an alloy of 52% by mass of indium and 48% by mass of tin, melting point 119° C.

From the above evaluation results, it has been confirmed that the resin belts of examples are excellent in thermal conductivity and mechanical strength.

(((1))) A resin belt comprising:

a resin;

a low-melting-point alloy having a melting point of 370° C. or lower; and a fibrous filler.

(((2))) The resin belt according to (((1))), wherein the low-melting-point alloy has a melting point of 210° C. or higher and 370° C. or lower.

(((3))) The resin belt according to (((1))) or (((2))), wherein a ratio Mf/Mm of a content Mf of the fibrous filler to a content Mm of the low-melting-point alloy is 1 or more and 10 or less.

(((4))) The resin belt according to any one of (((1))) to (((3))), wherein a content of the low-melting-point alloy is 1% by mass or more and 10% by mass or less with respect to a total mass of the resin belt.

(((5))) The resin belt according to any one of (((1))) to (((4))), wherein an aspect ratio of the fibrous filler is 3 or more.

(((6))) The resin belt according to (((5))), wherein the aspect ratio of the fibrous filler is 3 or more and 5,000 or less.

(((7))) The resin belt according to any one of (((1)) to (6)), wherein the resin contains polyimide.

(((8))) A fixing belt comprising:

a substrate layer consisting of the resin belt according to any one of (((1))) to (((7)));

an elastic layer on the substrate layer; and a surface layer on the elastic layer.

(((9))) A fixing device comprising:

the fixing belt according to (((8))).

(((10))) An image forming apparatus comprising:

an image holder;

a charging device that charges a surface of the image holder;

an electrostatic latent image forming device that forms an electrostatic latent image on the charged surface of the image holder;

a developing device that develops the electrostatic latent image formed on the surface of the image holder with a toner to form a toner image;

a transfer device that transfers the toner image formed on the surface of the image holder to a recording medium; and the fixing device according to (((9))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing belt comprising:

a resin belt comprising:

a resin;

a low-melting-point alloy having a melting point of 370° C. or lower; and a fibrous filler;

a substrate layer including the resin belt;

an elastic layer on the substrate layer; and a surface layer on the elastic layer, wherein a content of the low-melting-point alloy with respect to the resin belt is from 0.5 mass % to 20 mass %, and a content of the fibrous filler with respect to the resin belt is from 5 mass % to 40 mass %.

2. The fixing belt according to claim 1, wherein the low-melting-point alloy has a melting point of 210° C. or higher and 370° C. or lower.

3. The fixing belt according to claim 1, wherein a ratio Mf/Mm of a content Mf of the fibrous filler to a content Mm of the low-melting-point alloy is 1 or more and 10 or less.

4. The fixing belt according to claim 1, wherein a content of the low-melting-point alloy is 1% by mass or more and 10% by mass or less with respect to a total mass of the resin belt.

5. The fixing belt according to claim 1, wherein an aspect ratio of the fibrous filler is 3 or more.

6. The fixing belt according to claim 5, wherein the aspect ratio of the fibrous filler is 3 or more and 5,000 or less.

7. The fixing belt according to claim 1, wherein the resin contains polyimide.

8. A fixing device comprising:

the fixing belt according to claim 1.

9. An image forming apparatus comprising:

an image holder;

a charging device that charges a surface of the image holder;

an electrostatic latent image forming device that forms an electrostatic latent image on the charged surface of the image holder;

a developing device that develops the electrostatic latent image formed on the surface of the image holder with a toner to form a toner image;

a transfer device that transfers the toner image formed on the surface of the image holder to a recording medium, and the fixing device according to claim 8 that fixes the toner image to the recording medium.

10. The resin belt according to claim 1, wherein a content of the resin with respect to the resin belt is 60% or more.

* * * * *